United States Patent [19]
Kemp et al.

[11] Patent Number: 5,672,950
[45] Date of Patent: Sep. 30, 1997

[54] VOLTAGE, PHASE AND FREQUENCY CONTROL BY MINIATURE INVERTER SYSTEM

[75] Inventors: William Harry Kemp, Fallbrook; Victor Joseph Shideler, Carleton, both of Canada

[73] Assignee: ITT Corporation, New York, N.Y.

[21] Appl. No.: 291,239

[22] Filed: Aug. 16, 1994

[51] Int. Cl.$^6$ .................................................. H02P 5/34
[52] U.S. Cl. .......................................... 318/801; 318/811
[58] Field of Search ................... 318/801–811, 790–800

[56] References Cited

U.S. PATENT DOCUMENTS

| | | | |
|---|---|---|---|
| 4,047,083 | 9/1977 | Plunkett . | |
| 4,099,108 | 7/1978 | Okawa et al. | 318/808 |
| 4,237,531 | 12/1980 | Cutler et al. | 318/805 X |
| 4,238,821 | 12/1980 | Walker | 318/803 X |
| 4,465,961 | 8/1984 | Landino | 318/811 |
| 4,473,790 | 9/1984 | Plunkett et al. | 318/811 X |
| 4,620,296 | 10/1986 | Siemon | 318/803 X |
| 4,780,656 | 10/1988 | Mitchell | 318/806 X |
| 4,876,637 | 10/1989 | Mose et al. | 318/811 X |
| 4,879,639 | 11/1989 | Tsukehara | 318/803 X |
| 4,902,954 | 2/1990 | Oshima et al. | 318/806 X |
| 4,926,104 | 5/1990 | King et al. | 318/811 X |
| 4,994,950 | 2/1991 | Gritter | 318/811 X |
| 5,111,374 | 5/1992 | Lai et al. | 318/811 X |
| 5,121,043 | 6/1992 | Kerkman et al. | 318/811 X |

FOREIGN PATENT DOCUMENTS 0 63 71 27 A1  1/1995  European Pat. Off. .

OTHER PUBLICATIONS

Patent Abstracts of Japan, vol. 5 No. 192 (E–085), 8 Dec. 1981 and JP–A–56 115195 (Toshiba Corp), Sep. 1981.

IEEE Review, vol. 131, 7 Sep. 1984, pp. 516–558, B.L. Jones et al., "Electrical variable–speed drivers".

Soviet Patent Abstracts, Section E1, Week 9020 27 Jun. 1990, Derwent Publications Ltd., London, BG; Class X12, AN 90–154359 & SU–A–520 638 (LVOV Poly), 6 May 1987.

Primary Examiner—David S. Martin
Attorney, Agent, or Firm—Menotti J. Lombardi

[57] ABSTRACT

A power supply for a variable speed AC motor includes a waveform generator for generating a periodic pulsed waveform according to a desired motor speed, an adjustable source of DC potential, and an inverter coupled to the waveform generator and to the source of DC potential. The inverter provides an AC pulse train to the AC motor, the pulse train having waveform characteristics according to the pulsed waveform generated by the waveform generator to obtain the desired speed. The voltage amplitude of the pulse train provided to the motor is proportional to the DC potential whereby motor currents can be controlled at the desired motor speed by varying the DC potential.

10 Claims, 6 Drawing Sheets

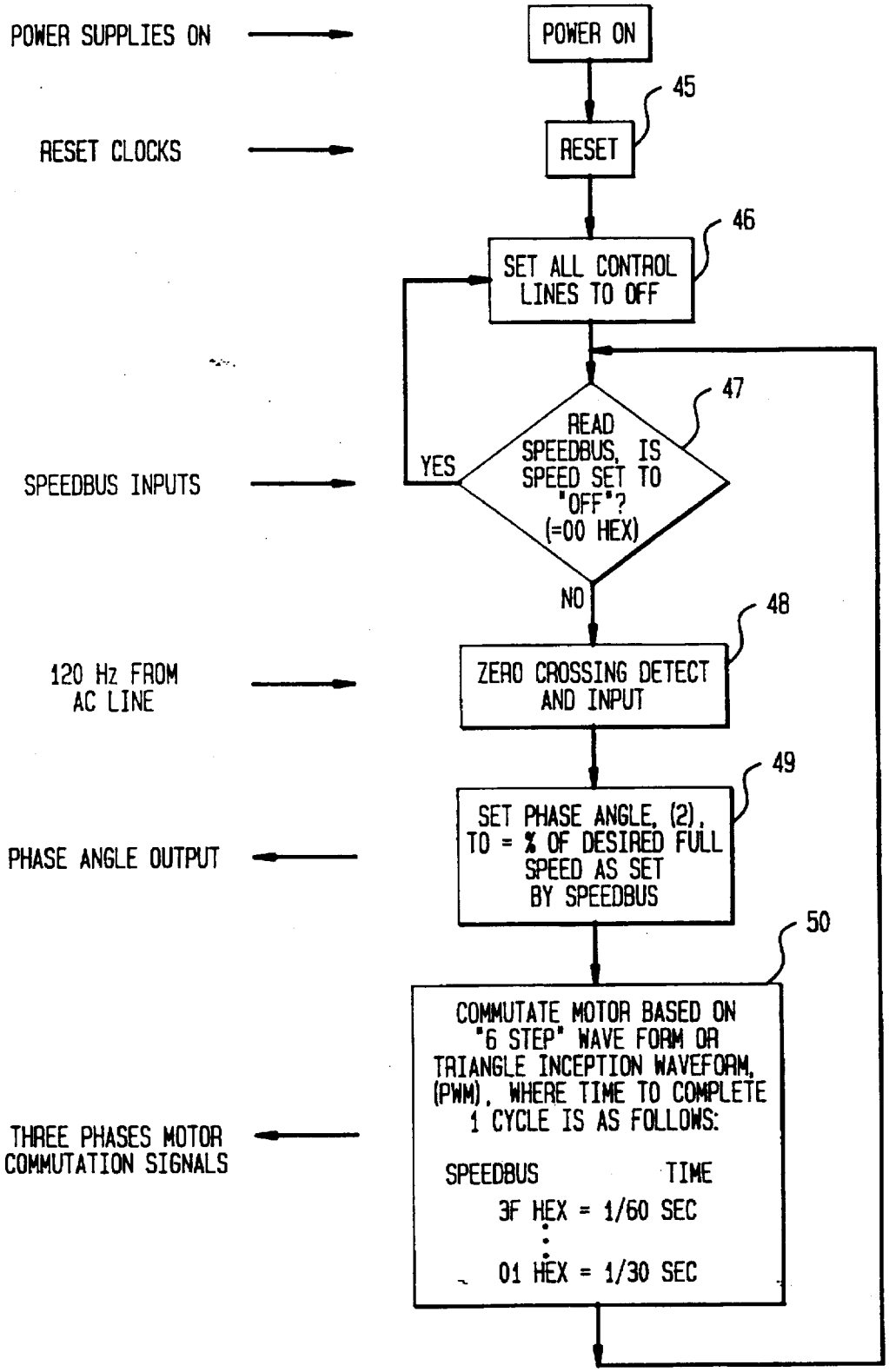

1

VOLTAGE, PHASE AND FREQUENCY CONTROL BY MINIATURE INVERTER SYSTEM

FIELD OF THE INVENTION

This invention relates to AC induction motor control systems and more particularly, to static systems having proportionally adjustable frequency and voltage output for controlling the speed and torque of an AC motor.

BACKGROUND OF THE INVENTION

The speed of an AC induction motor may be controlled by adjusting the frequency of the AC voltage applied to it. In constant torque applications, the motor magnetic flux density must remain constant. Therefore a reduction in frequency should be accompanied by a directly proportional reduction in voltage amplitude.

Should this rule not be followed, motor damage and/or overheating will result due to abnormally high motor currents.

Early systems in the prior art utilized a variable voltage DC power supply which provided DC power to an inverter. The inverter generates, for example, three phase AC output power to drive the AC motor load. The DC power supply also controlled a Variable Frequency Oscillator (VFO), whose output frequency was reduced in direct proportion to the input DC voltage. The VFO generates three-phase signals applied to the inverter to control the inverter output frequency. An adjustment of the DC power supply to lower the DC output voltage results in both the amplitude and frequency of the inverter being lowered proportionally. These early systems typically utilized thyristors or power Silicon Controlled Rectifiers (SCRs) as the power switching elements of the inverter system.

Early inverter systems also utilized a crude time-ratio control of the power switching semiconductors to lower the voltage amplitude of the motor stator windings. One time-ratio control technique is called "square wave mode operation", wherein the power semiconductor switching devices are switched only at half cycle intervals. By delaying the turn on time and advancing the turn off time of the power semiconductors in relationship to the "full voltage" conduction time, average motor voltage is lowered. Although square waves contain a high percentage of harmonics and motor torque ripple is increased, inverter power and control system design was simplified.

Whereas thyristors and SCRs could handle the large currents typically required for AC motor loads, they could not operate at high switching frequencies. Advances in semiconductor technology allowed newer types of power switching elements to be developed. Bipolar power transistors could be arranged to handle large DC currents applied to the inverter, as well as switch the applied voltage at high frequencies. With the developments of higher speed power switching devices, the DC voltage applied to the inverter could remain fixed. The voltage applied to the motor stator windings could be varied by applying a switching time-ratio control technique to the power switching devices. This means of switching time-ratio control system is the triangle interception mode of Pulse Width Modulation, (PWM). (See U.S. Pat. No. 4,047,083, dated Sep. 6, 1977).

The triangle interception mode of PWM provides for sinusoidally weighted, width modulated pulses to be applied to the inverter. The voltage at the output of the inverter is directly proportional to the modulation ratio or duty cycle of the time the inverter is turned "on" to the time it is turned "off". A person skilled in the art will be familiar with the details of triangle interception mode of PWM. This means of time-ratio voltage control causes the AC motor to "see" essentially a sine-wave stator voltage without the drawbacks described in "square wave mode operation".

One drawback of the Bipolar Transistor PWM inverter system is the inverter switching losses in the power switching semiconductors. As the frequency of the inverter switching time increases, the power semiconductors generate heat as a function of their respective Joule heating switching losses.

When a bipolar transistor is switched from a blocking state (off) to a conducting state (on), there is a finite period of time when the transistor is neither fully blocking nor fully conducting current. During this time in which the transistor is essentially acting as a resistor, heat losses are generated across the device. Moreover, when the transistor is fully conducting, the "on state resistance" is not equal to zero. This leads to further heat generated by the transistor. The total "on state resistance", multiplied by the motor conducting current squared, multiplied by the ratio of the on time to the off time multiplied by the number of semiconductor power switching devices results, (approximately) in the inverter heat conducting losses. Added to the inverter conducting losses are the inverter switching losses. A person skilled in the art could mathematically model heat losses for a given inverter system. These heat losses must be removed from the inverter or inverter power semiconductor damage will result.

It will thus be apparent that the inverter semiconductor losses are a function of the motor control current, and the power semiconductor switching and conducting losses. Motor current will generally remain fixed for a given motor size and performance.

Power semiconductor switching technology has further advanced to create low switching/conducting loss power semiconductors known as Power MOSFETS or Power Metal Oxide Semiconductor Field Effect Transistors. For a given inverter system utilizing Bipolar transistors, replacing the Bipolar transistors with a MOSFET design will reduce heat output by orders of magnitude. Further advances in power semiconductors will lower overall switching/conducting losses.

From the prior art it is known that commercial inverter systems often utilize a hybrid of the square wave mode of operation and triangle interception PWM. When an AC motor is at optimum voltage and frequency, the need to modulate the motor voltage is reduced. Typical inverter systems currently provide some means of transferring from square wave mode of operation at high speed to triangle interception PWM at lower speeds. (See U.S. Pat. No. 5,121,043 dated Jun. 9, 1992).

It is apparent from the above descriptions that thermal efficiency of the combined motor/inverter system is a function of the semiconductor losses and the motor heating losses. These two sets of losses typically compete with each other. For example, semiconductor switching losses can be reduced by operating in the square wave mode, however, motor heating losses are increased. Where the inverter and motor are separate units, proper design dictates that each unit should operate at the highest efficiency without decreasing the efficiency of the device connected to it.

For an integrated control/inverter/motor system, such as contemplated by the herein invention, the design of the overall system can be treated as one unit. Therefore, the motor heating losses and the power semiconductor losses are summed together to determine the thermal efficiency of the complete system. By integrating the efficiency models for each component together (motor, inverter, control), the optimum system components can be arranged into a unique system.

It is therefore an object of the present invention to provide a power supply for supplying AC pulsed voltage of variable frequency and amplitude to an adjustable speed AC induction motor, having improved electric power conversion efficiency.

It is another object of the instant invention to provide such a power supply that affords independent control of the voltage amplitude of the AC pulsed voltage waveform for improved thermal efficiency at any desired motor speed.

It is a further object of the present invention to provide such a power supply which affords free control of the thermal efficiency by independent pulsewidth control of the AC pulsed voltage waveform.

It is an additional object of the present invention to supply the AC pulsed voltage with a six step square wave waveform to reduce switching losses in the inverter power transistors.

SUMMARY OF THE INVENTION

The present invention is directed to a power supply for a variable speed AC motor, comprising waveform generation means for generating a periodic pulsed waveform according to a desired motor speed; an adjustable source of DC potential; and inverter means, coupled to said waveform generation means and to said source of DC potential, for providing an AC pulse train to said AC motor, said pulse train having waveform characteristics according to said pulsed waveform to obtain said desired speed, and a voltage amplitude according to said DC potential wherein motor currents can be controlled at any said desired motor speed by varying said DC potential.

Preferably, the power supply provides a "six step" waveform drive to the AC motor with any desired speed obtained by controlling the PRF of the pulse train. The voltage amplitude of the AC pulse waveform can be controlled independently of the speed in accordance with the motor operating range by adjusting the DC potential applied to the inverter means. In one embodiment, the voltage amplitude is maintained at an approximately constant ratio to the PRF such that excessive motor currents will not occur at lower motor speeds. Thermal efficiency is thereby improved by reducing both motor heating losses and inverter power transistor "onstate" heating losses. The pulsewidths within the pulse waveform are also capable of being controlled independently to provide fine adjustment of motor currents thus further optimizing thermal efficiency. The present invention provides another advantage over the PWM systems of the prior art in that the six step square wave waveform generated affords less frequent switching of the high power transistors in the output stage of the inverter means, thereby reducing switching losses and further improving thermal efficiency.

BRIEF DESCRIPTION OF THE DRAWINGS

For a better understanding of the present invention, reference is made to the following description of an exemplary embodiment thereof, considered in conjunction with the accompanying drawings, in which:

FIG. 4 is a flow chart, describing the operation of software utilized in the inverter system.

DETAILED DESCRIPTION OF THE INVENTION

Figure 1:
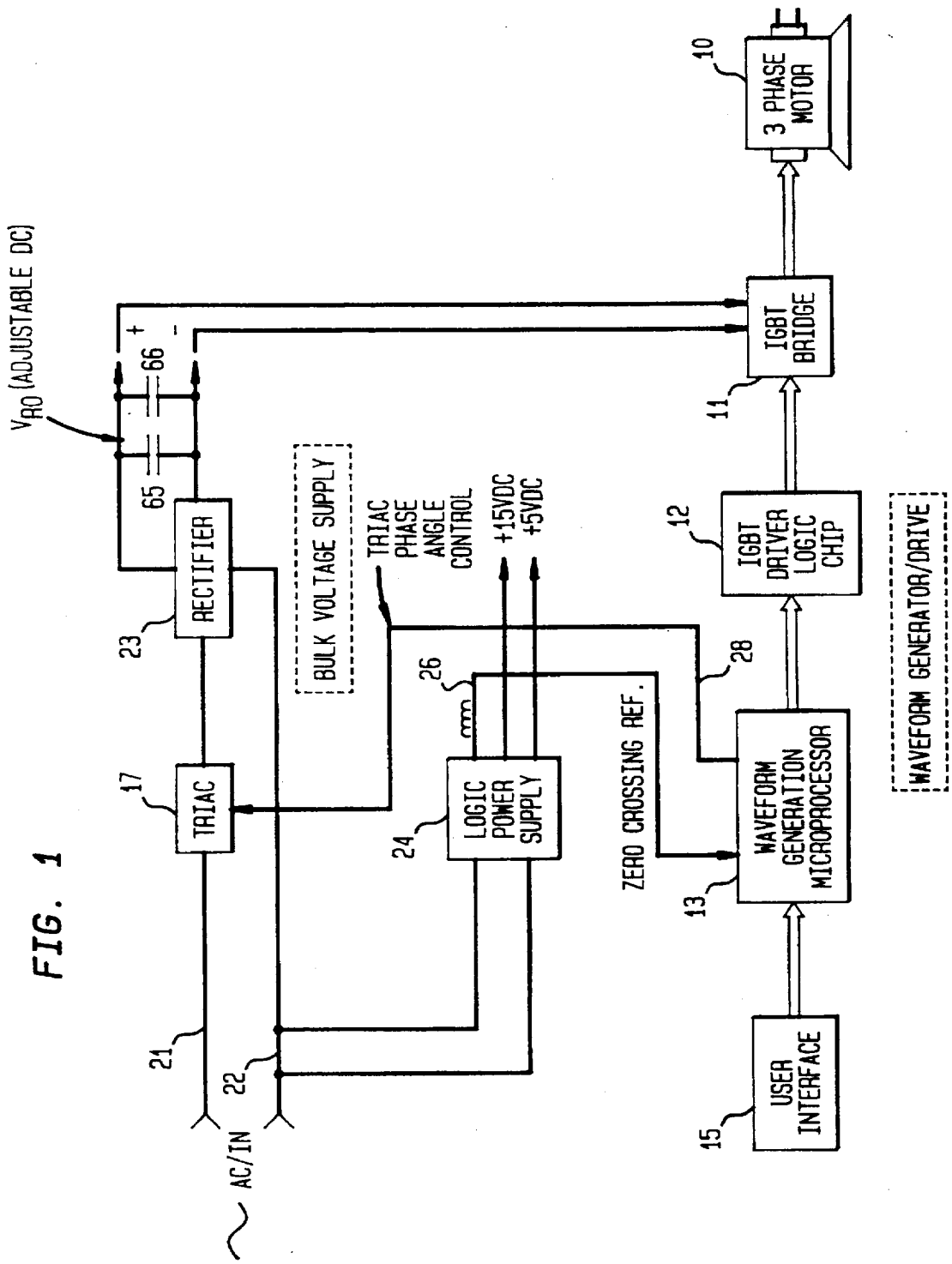
FIG. 1 is a block diagram of an induction motor power supply in accordance with the invention.

FIG. 1 is a block diagram of the power supply according to the invention which provides an optimized pulsed AC voltage drive to an AC induction motor. The voltage amplitude and waveshape of the pulsed AC voltage drive is adjustable and optimized according to the desired motor speed. The pulsed AC voltage drive, whether an alternating pulse train or a PWM waveform, approximates a sine wave with an underlying frequency. The motor speed is a function of this underlying frequency of the sinusoid approximated. The pulsed AC drive is optimized for thermal efficiency by adjustment of the voltage amplitude of the pulses for coarse adjustment, and of the pulsewidth(s) for fine adjustment. The pulsed voltage amplitude is generally designed to be proportional to frequency for optimum performance.

Preferably, a "sixstep" square wave waveform is provided to the three windings of a three phase AC motor 10. The six step waveform is the combination of three independent waveforms, each a pulse train of alternating polarity voltage pulses. The three independent waveforms are identical but offset from each other in phase by 120 degrees. (FIG. 2B, which will be discussed in more detail below, shows a six step waveform which consists of three voltage waveforms 31, 32, 33 each to be applied to one of three motor windings). Each of the alternating pulses have the same pulsewidth—hence, there is only one pulsewidth which can be varied for fine tuning of motor voltage duration and thus, fine tuning of conduction losses. The advantage of the six step waveform over PWM techniques of the prior an is that, with the six step approach, a full cycle of a sine wave is approximated by only two pulses of opposite polarity. On the other hand, PWM waveforms are a closer approximation to a sine wave but several voltage pulses each of a different pulsewidth are required for each half of the sine wave. Thus, more frequent on-off switching by the high power transistors in the inverter output stage is necessary for PWM operation thereby resulting in higher switching losses. Since a primary goal of the present invention is to reduce switching and motor losses, the six step voltage waveform is preferred. However, if so desired one can also provide a PWM waveform and still achieve lower motor heating losses by the pulse voltage amplitude reduction technique according to the invention, as will be described.

Higher motor speeds, of course, require AC driving pulses with relatively high pulse repetition frequencies (PRFs). Lower motor speeds utilize lower PRF's which are desirably accompanied by proportionally lower voltage amplitudes. These accompanying voltage amplitudes are preferable in order to avoid overheating as a result of abnormally high motor currents. Hence an approximately constant ratio of voltage amplitude to PRF along with approximately constant pulsewidth to PRF ratio (constant duty cycle) is an objective of the preferred embodiment. If one so desires, however, virtually any desired combination of voltage amplitude, pulsewidth and PRF can be provided by the teachings of the present invention. Practically, AC induction motors are specified to operate with drive voltages within a predetermined operating range of these three parameters. That is, the voltage amplitude to PRF ratio and duty cycle will generally be specified as approximately constant. In any case, the present invention presents a novel means to provide essentially whatever AC pulsed voltage waveform is desired, as will be explained.

As shown in FIG. 1, the AC line voltage to be convened to the AC pulsed waveform motor drive, is applied to input terminals 21 and 22. A logic power supply 24 coupled thereto receives the AC line voltage, and transforms it to a reduced AC voltage. This reduced AC voltage is rectified into half wave sinusoids and provided on line 26 to a waveform generation microprocessor 13. The half wave sinusoids are synchronized to the AC line voltage and thus a zero crossing reference of the AC line voltage is established. Logic power supply 24 also provides +5 V and +15 V DC to power various circuit components.

The zero crossing reference is used to provide a phase angle synchronized control signal on line 28 to a triac 17. The control signal to the triac 17 will control the generation of an adjustable D.C. voltage which will in turn control the voltage amplitude of the high voltage AC driving pulses to motor 10.

The desired motor speed is entered from a user interface 15 which then provides a codeword indicative of the desired speed via a speedbus to the microprocessor 13. Of course, the desired speed does not have to be entered manually on user interface 15 but may be automatically communicated to the microprocessor 13 via external computer control. In any case, upon receiving the codeword indicative of the desired speed, microprocessor 13 determines the optimum values of the pulsed voltage waveform to be eventually applied to the three phase AC induction motor 10. That is, the optimum voltage amplitude, PRF and pulsewidths are determined for that speed. Microprocessor 13 may have an algorithm stored therein to compute these optimum values upon receipt of the speed codeword. Alternatively, ROM look-up tables having stored values of pulsewidth, etc. corresponding to given motor speeds may be employed within microprocessor 13. These tables would then be scanned whenever motor speed codewords are received, and the optimum values therein extracted.

Upon determining the optimum voltage amplitude for driving AC motor 10, microprocessor 13 computes a conduction angle for converting only a portion of the AC line voltage into the adjustable D.C. voltage. This conduction angle during which time the AC voltage energy is used, is determined by providing the aforementioned phase angle control signal on line 28 to a control terminal of the triac 17. Triac 17 is coupled on its input side to AC input line 21 and on its output side to rectifier 23. Triac 17 essentially acts as a switch, responsive to the phase angle control signal, to control the flow of AC line current from terminal 21 to the rectifier 23. The rectifier 23 has one input terminal coupled to the output of triac 17, and its other input terminal coupled to AC line voltage input terminal 22. Thus, during the time intervals when the triac 17 is "on", the AC line voltage is applied to the input terminals of rectifier 23 whereupon the AC voltage is rectified. The rectifier output voltage is thus the absolute value of the AC line voltage during "on" intervals of triac 17. The output voltage of rectifier 23 is designated as Vro. Capacitors C5 and C6 function to smooth output voltage Vro, reducing switching transients.

Figure 2A:
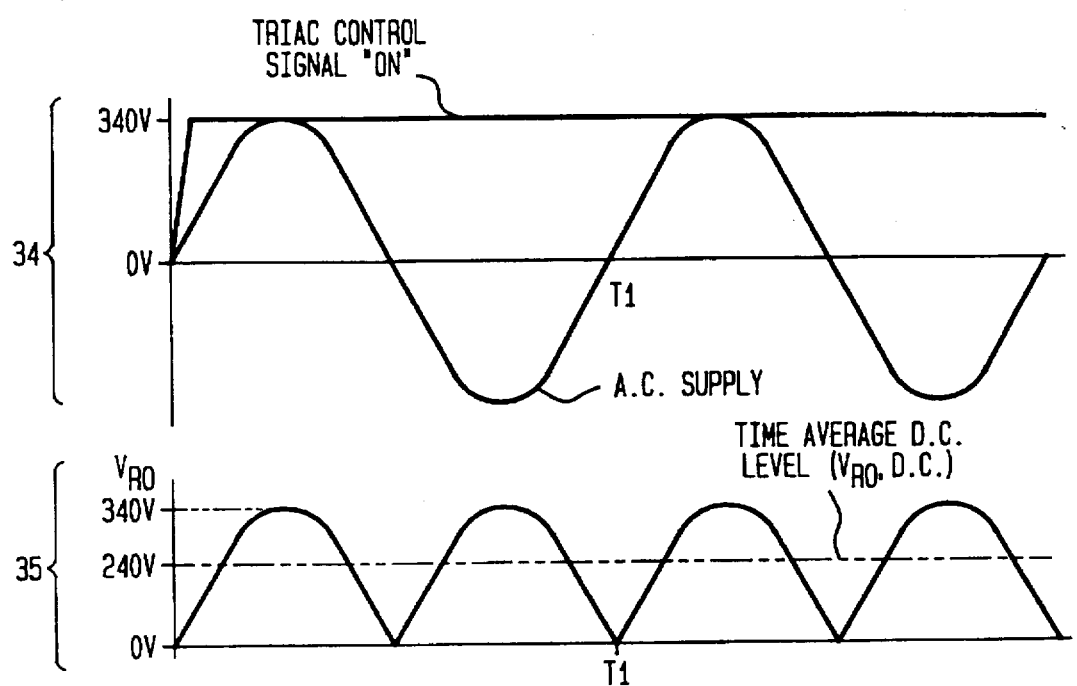
FIGS. 2A-2D are timing diagrams showing the wave form generation and DC voltage adjustment employed in the invention, utilizing the "six step square wave" technique.
Figure 2B:
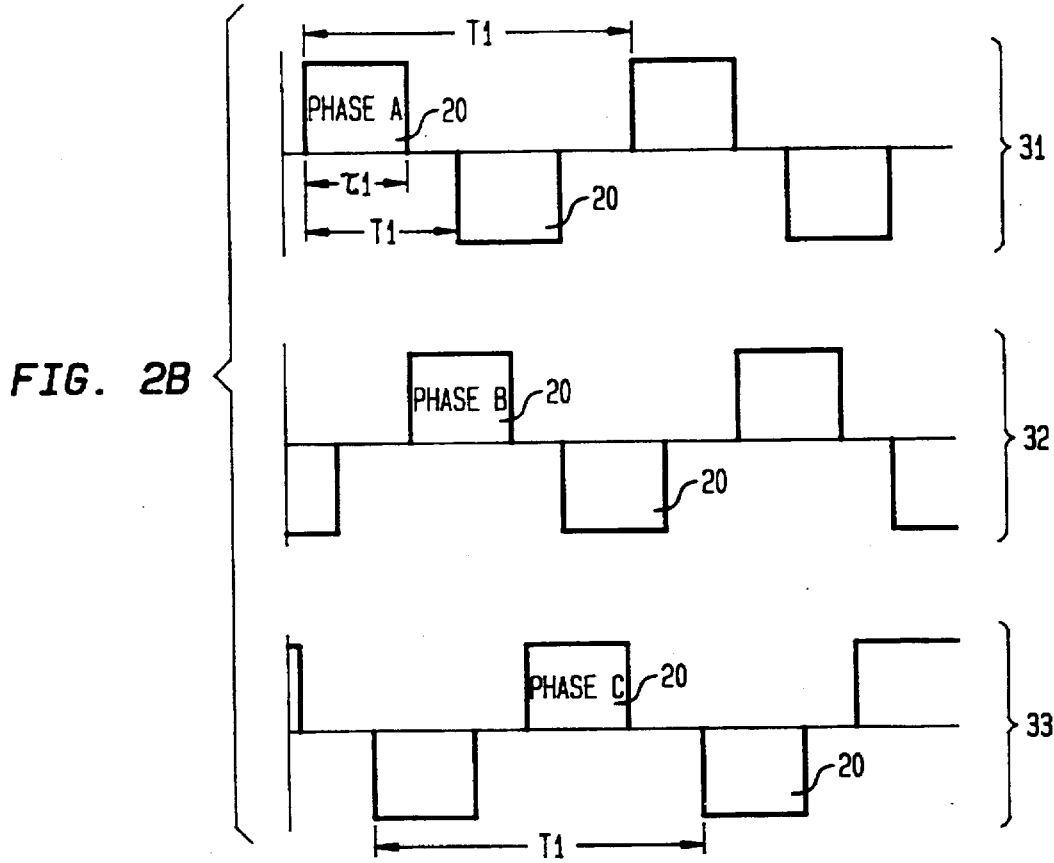
Figure 2C:
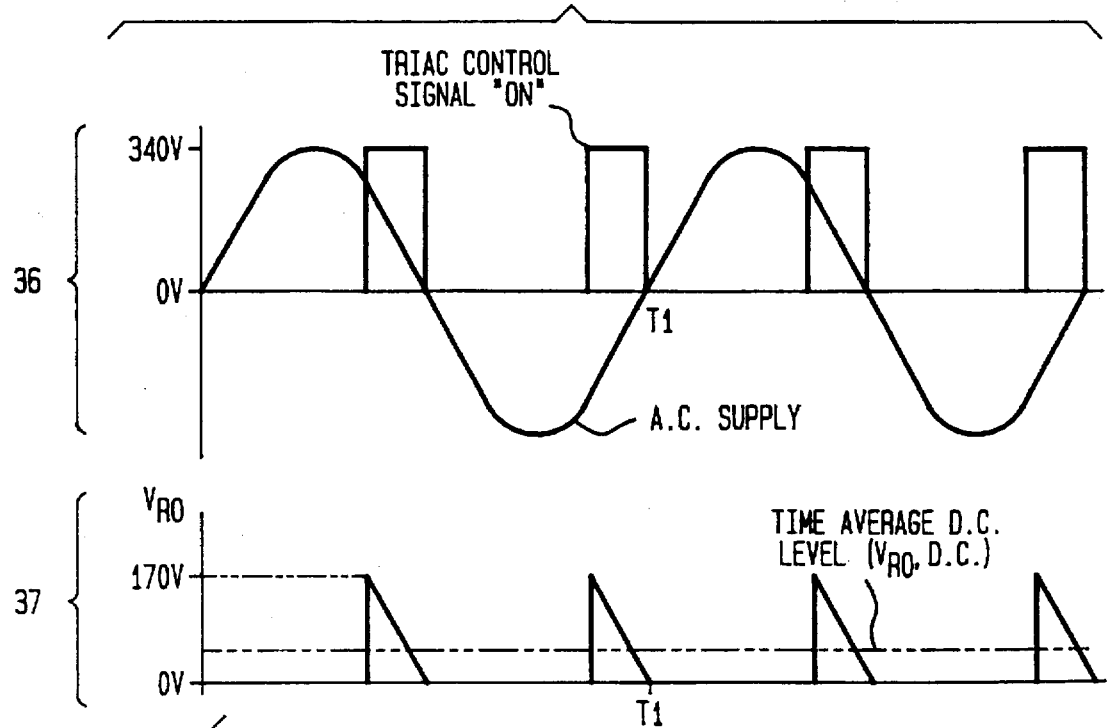

FIGS. 2A and 2C illustrate the rectifier output voltage Vro waveform as a function of the AC line voltage and the triac phase control signal. FIG. 2A, graph 35 shows the rectifier output voltage Vro for "full speed" operation. In this case, Vro is essentially the absolute value of the continuous AC line voltage (e.g., 120 Hz). The time averaged DC level of Vro (Vro,dc) is maximized in this case. The D.C. voltage Vro,dc is the aforementioned DC voltage level that is adjustable by means of the phase angle control signal ( or "conduction angle control signal") from the microprocessor 13 to the triac 17. For illustration purposes, the peak AC line voltage is shown as 340 volts. The maximum value of Vro,dc is then $340/\sqrt{2} \approx 240$ V. In the full speed case, the triac control signal shown in graph 34 is continuously "on" (with a finite rise time, of course). This enables the full rectification of the AC line voltage and thus, maximum DC voltage to be applied to insulated gate bipolar transistor (IGBT) bridge 11. Maximum DC voltage to IGBT bridge 11 produces maximum AC pulsed voltage amplitude to be applied to AC motor 10, as will be described.

FIG. 2C shows a case where the DC component of Vro is substantially reduced in order to provide a lower motor speed. We will assume that this corresponds to the "half speed" case. In this scenario, the triac control signal as seen in graph 36 is a periodic pulse train with a PRF equal to twice the AC line voltage frequency. The phase relationship of the triac control signal to that of the AC line voltage is chosen such that the control signal overlaps in time a predetermined portion of the AC line voltage. This predetermined portion is computed by the microprocessor to correspond to a desired time averaged DC component of Vro (Vro,dc) that will result, as seen in graph 37. Vro,dc is of a value optimized for the particular speed selected. In the half speed case of FIG. 2C, Vro, peak is 170 volts and Vro,dc may be readily computed by integration and is substantially less than 170 V. While the triac control signal pulses in the half speed case are shown to turn "off" when the AC line voltage is zero, this is not a necessary result—the triac control pulses can just as easily be designed to turn off at other predetermined synchronized points in time.

Referring again to FIG. 1, waveform generating microprocessor 13 also generates a pulsed waveform in accordance with the desired motor speed control word. The waveform generated is preferably a periodic pulse train with alternating polarity voltage pulses. As explained previously, the microprocessor 13 determines the optimum combination of pulsewidth, PRF and pulse amplitude in accordance with the speed by using an algorithm and/or scanning memory tables. The microprocessor generated waveform is then a low voltage AC pulse train with the optimally determined pulsewidth and PRF. This generated waveform is provided to an IGBT driver logic chip 12. The amplitude of the pulses provided at this point are only of a low controlling voltage to enable controlled switching of low power transistors within the IGBT logic chip 12 in accordance with the waveform.

FIG. 2B shows the microprocessor generated waveform for the "full speed operation" case. Three signals are generated simultaneously and provided in parallel designated by graphs 31, 32 and 33. The waveform of each graph are identical except that each is of a different phase A, B or C as shown. Phase B leads A by 120°, phase C leads B by 120°—hence the familiar six step waveform is generated. Each pulse 20 occurs at a frequency 1/TI which determines the motor speed, and has an optimized pulsewidth $\tau 1$. It is noted that the graphs of FIGS. 2A and 2B have the same time scales. Hence it is seen that one illustrative selection of the pulse period TI for full speed operation is the same period T1 as the AC line voltage.

Figure 2D:
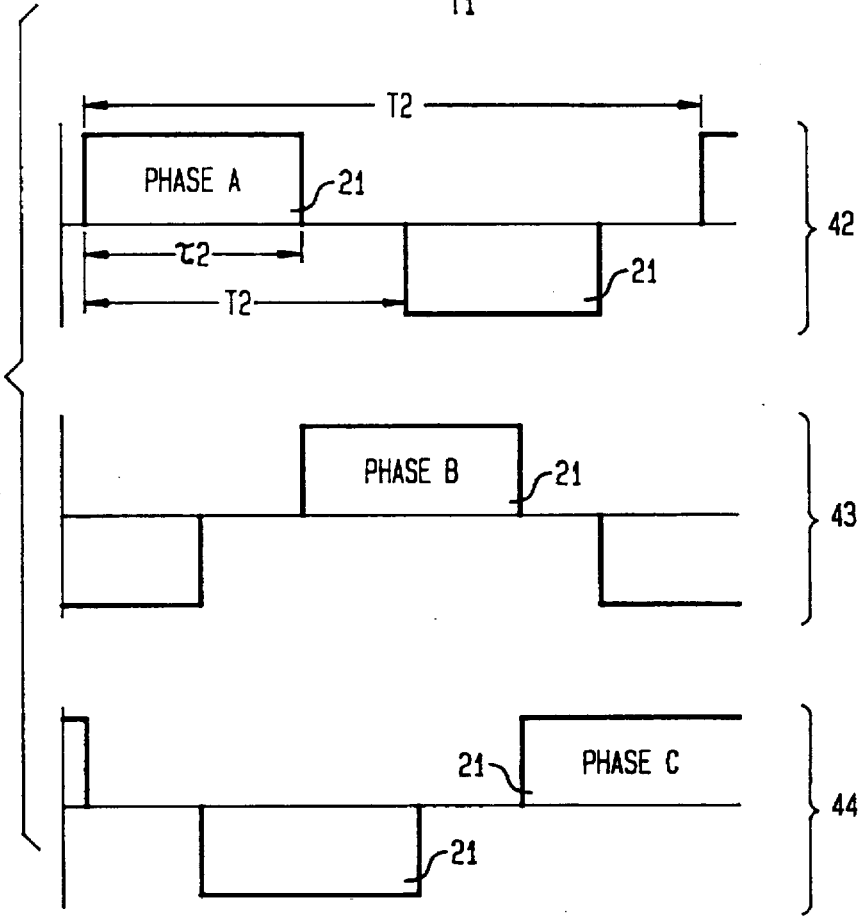

FIG. 2D shows the microprocessor generated waveforms 42, 43 and 44 corresponding to the "half speed" case. A six step waveform is provided, with each pulse 21 having a pulsewidth of τ2 and occurring at a period of T2. T2 is twice T1 and hence, half speed is obtained. The duty cycle τ2/T2 is approximately the same as the full speed case (τ1/T1) but may be varied in conjunction with the time average D.C. level to optimize conduction losses.

Finally, the IGBT driver 12 provides IGBT bridge 11 with essentially with an amplified intermediate voltage replica of the microprocessor generated three phase waveform. The DC rectifier output voltage Vor is provided to IGBT bridge 11 and essentially integrated in time and converted to a suitable bias voltage for the high power transistors therein. IGBT bridge 11 basically amplifies the intermediate voltage IGBT driver output waveform to provide the high voltage three phase AC pulsed drive to three phase motor 10 where the magnitude of the high voltage output pulses are proportional to the time averaged DC component of Vor. As previously stated, the frequency of the AC pulsed output signal will determine the motor speed, with the voltage magnitude and pulsewidth controlled to minimize thermal losses.

Thus, a high voltage AC pulse train drive to the AC motor 10 is provided wherein the ratio of PRF to pulse train voltage amplitude, may be optimized along with the duty cycle for any given motor speed. The optimization may be refined merely by modifying the software algorithm within the microprocessor 13.

Shown in FIGS. 3(A, B) is an exemplary detailed circuit diagram of the AC motor power supply of FIG. 1. The same reference numerals are used in FIG. 3 when replacing the equivalent components of FIG. 1. The power supply converts an AC line voltage at input terminals 21 and 22 to a three phase AC pulsed waveform at the three windings of AC motor 10.

The AC line voltage is applied to the terminals of primary winding 1a of transformer 1. The AC line voltage is also coupled through triac 17 to one terminal of rectifier 23. The AC line voltage return line is connected directly to the other terminal of rectifier 23. Secondary winding 1b of transformer 1 provides a reduced voltage to AC voltage supply unit 4, which provides the +5 and +15 Volt supply for the circuit components. Diode D15 and capacitor C10 serve to rectify and smooth the voltage applied to supply unit 4 in a known manner.

As explained above, the rectifier 23 provides a variable DC output that is smoothed by capacitors C5 and C6 and for example, may have a maximum value of 340 Volts. The voltage is determined by the phase angle and duration of the phase angle trigger control pulses applied to the triac 17 by microprocessor 13, via line 28.

Secondary winding 1c of transformer 1 is applied through diode bridge D1, D2, D3 and D4 to voltage supply unit 5, which provides the +5 volt power supply required to drive the microprocessor. Line 26 also provides the train of unidirectional half sinusoids from the diode bridge D1, D2, D3 and D4. As explained with reference to FIG. 1, these half sinusoids are provided to microprocessor 13 and are synchronized to the AC line voltage to provide a zero crossing reference. This enables microprocessor 13 to generate the phase control signal to triac 17 for adjusting the D.C. output voltage of rectifier 23.

A three phase electronically controlled induction motor 10, has windings A, B, C connected in a star configuration to respective outputs of IGBT bridge 11, which is in turn connected to IGBT driver circuit 12 receiving a +15 Volt power supply from unit 4. 6-bit speed control word from a parallel speed control bus (not shown) is applied to input optical isolators 25, and the decoded outputs applied to the input terminals of the microprocessor 13. The user interface 15 of FIG. 1 thus includes the parallel speed control bus and the optical isolators 25.

All other pertinent circuit operation should be understood from the discussion pertaining to the block diagram of FIG. 1.

Figure 3A:
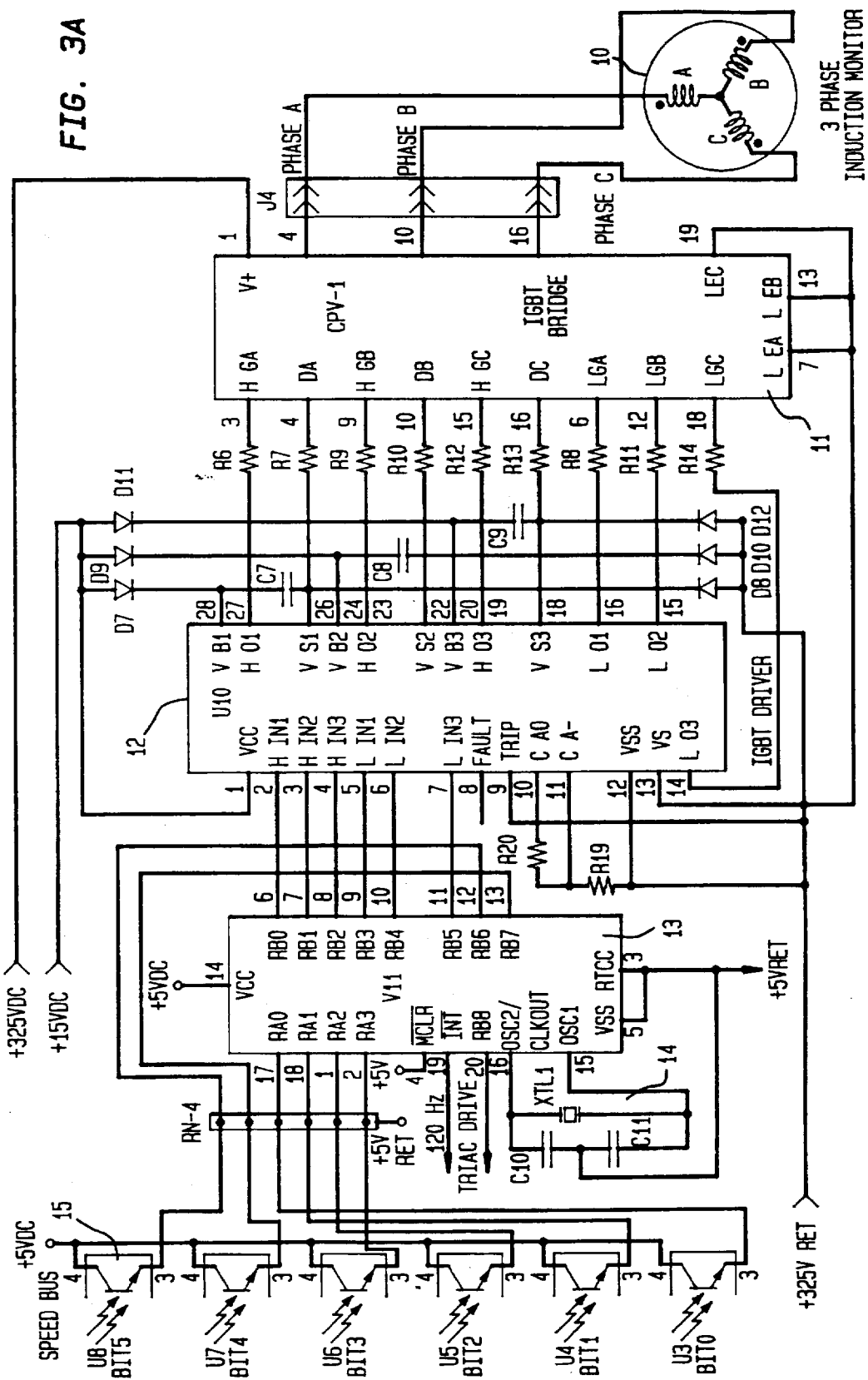
FIGS. 3A and 3B show a functional example of a three phase, a.c. induction motor drive system in accordance with the invention and an extension of the block diagram outlined in FIG. 1.
Figure 3B:
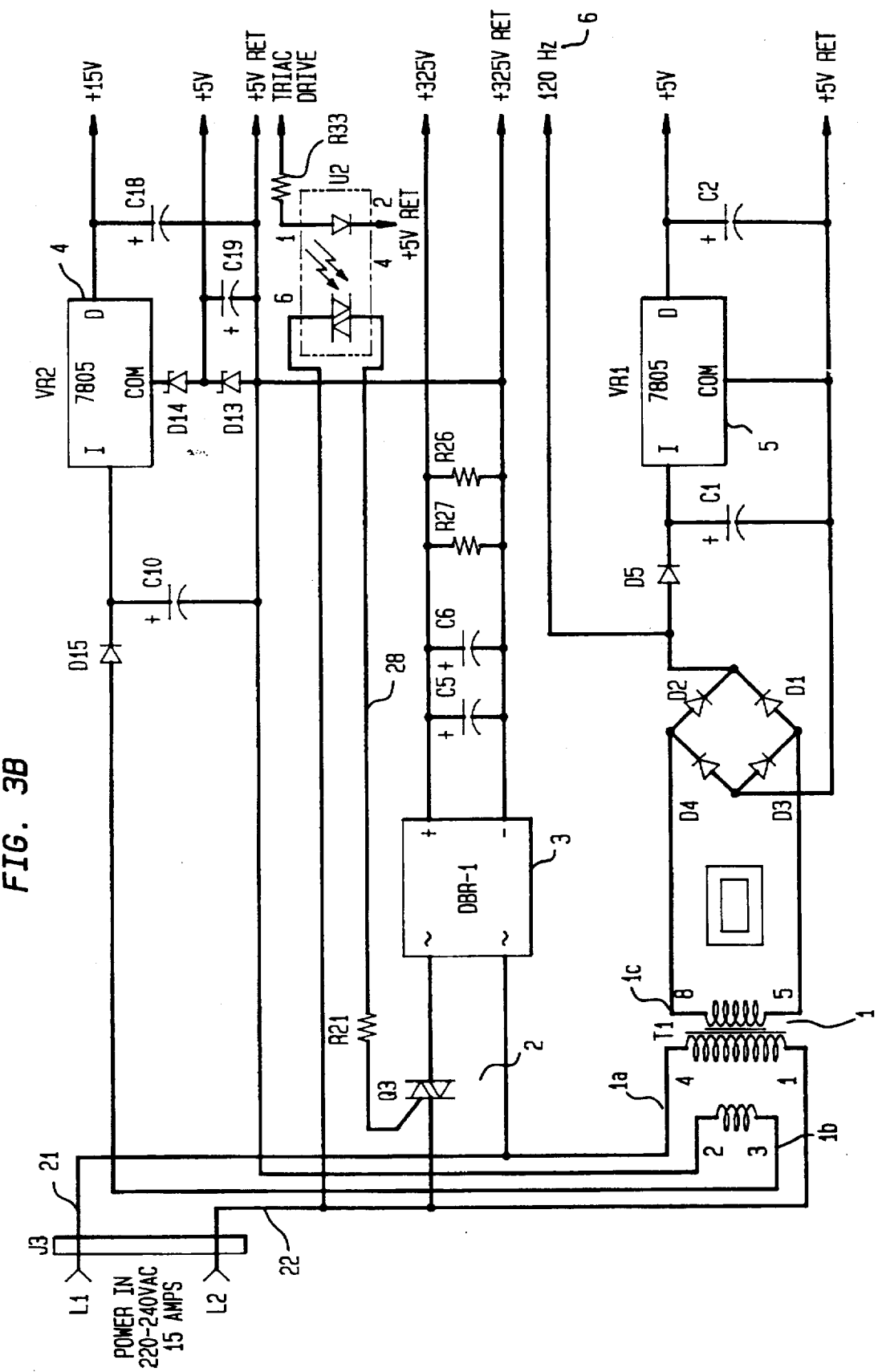

Typical values, manufacturer and part numbers for the components shown in the circuit diagram of FIGS. 3A and 3B are as follows:

Motor 10 is a 3 Phase induction motor, 1 hp, 240 volts, 60 hertz, e.g.-ITT Bell and Goswett 3 Phase 240 V Induction Motor C1, C10, are 2,200 uf, capacitors 25 volts C2, C18, C19 are 220 uf, capacitors at 25 volts C5, C6 are 330 uf, capacitors at 400 volts C11 is a 22 pf, capacitor/50 volts C7, C8, C9 are 0.1 uf, capacitors at 500 volts IGBT Bridge 11 is an International Rectifier I.G.B.T. 3 phase module Rectifier 23 is a DF04 rectifier bridge D1, D2, D3, D4, D5, D15 are 1N4005 diodes D7, D8, D9, D10, D11, D12 are UF4005 ultra fast diodes D13, D14 are 5 volt zener diodes 5 Triac 17 is a MAC223 triac RN-4 is a 10 kohm pull up resistor network R6, R7, R5, R9, R10, R11, R12, R13, R14 are 100 ohms R19, R20 are 1000 ohm 1/2 watt R21 is 1000 ohm, 1/4 watt R26, R27 are 100 k ohm 1 watt R33 is 330 ohms, 1/4 watt Speed bus optical isolators 15 are MC3043 optoisolators T1 is a 230 volt input transformer, 8 & 20 vac output 0.25 amp U2 is an MC3043 optical isolator IGBT Driver 10 is an International Rectifier IR2130 I.G.B.T. driver Microprocessor 13 is a Motorola MC68HC705K0

VR-1, VR-2 are MC7805, 5 volt regulators

XTL-1 is a 4.0 Mhz. crystal oscillator

Referring now to FIG. 4, a flow chart is shown illustrating the operation of software utilized in the inverter system exemplified as in FIG. 1. Upon power turn-on, the clocks within microprocessor 13 are reset and all control lines are set to OFF (steps 45, 46). Then in step 47, microprocessor 13 reads the speed control codeword (speedbus input) originating from the user interface 15. If a codeword of 00 Hex is received corresponding to the speed being selected as OFF, control lines are again set OFF in step 46. Otherwise, microprocessor 13 detects the zero crossing reference from the logic power supply 24 in step 48. The phase angle control signal is then set to a percentage of the full speed as determined from the speed codeword, the control signal then being provided to triac 17 (step 49). Finally in step 50, the AC motor 10 is commutated by providing the three phase motor commutation voltages thereto. As discussed above, preferably a six step waveform is generated by the microprocessor 13 and provided to the motor in high voltage form via IGBT bridge 11 but alternatively, a PWM waveform can be generated and provided to the AC motor 10. It is noted that block 50 also indicates that speed codewords ranging from 01 Hex to 3 F Hex can be supplied to obtain motor speeds of 30 Hz. to 60 Hz., respectively.

From the foregoing, disclosed is a power supply for providing an AC pulse train to drive a variable speed AC induction motor. A desired speed of the AC motor is achieved by controlling the PRF of the pulse train. An advantage of the invention is that the voltage magnitude of the pulse train can be independently varied in accordance with an optimum operating range for the motor for any given speed. Thus, motor currents can be independently controlled allowing motor conduction losses to be minimized. In addition, the pulsewidth of the AC pulse train can be independently varied to provide further control of the motor currents. The present invention preferably utilizes a six step square wave AC voltage waveform to drive the AC motor. This is an advantage over the PWM techniques used in the prior art in that less switching of the high power transistors in the output inverter stage is required, thereby reducing switching losses of the power transistors in the inverter. The invention also provides an advantage over the VFO techniques of the prior art in that independent and more precise control of the AC pulse train voltage amplitude and pulsewidths is provided.

It should be understood that the embodiment described herein is merely exemplary and that a person skilled in the art may make many variations and modifications without departing from the spirit and scope of the invention. All such modifications are intended to be included within the scope of the invention as a defined in the appended claims.

What is claimed is:

1. A method of controlling a variable speed AC motor, comprising the steps of:

selecting a predetermined operational speed for said variable speed AC motor;

determining an optimal pulsewidth and pulse repetition frequency for an AC pulsed voltage used to drive said AC motor at said predetermined operational speed;

generating a first low voltage AC pulse train having pulses occurring at said pulse repetition frequency and said pulsewidth;

converting an AC line signal into an altered AC signal by passing said AC line signal through a switch controlled by said first low voltage AC pulse train;

producing a DC voltage by combining and rectifying said AC line signal with said altered AC signal;

amplifying said first AC pulse train to provide a AC pulsed voltage having said pulse repetition frequency and said pulsewidth;

modifying said AC pulse voltage to have an amplitude magnitude proportional to said DC voltage; and providing said AC pulsed voltage to said AC motor to drive said AC motor at said operational speed.

2. A control device for a variable speed induction motor, comprising:

an alternating current source for supplying a predetermined AC signal;

input means for selecting an operational speed for said induction motor;

processing means for determining optimal waveform criteria for driving said induction motor at said operational speed;

control signal generator coupled to said alternating current source and said processing means for producing a control signal from said AC signal;

switching means coupled to said alternating current source and said control signal generator, wherein said switching means is controlled by said control signal and selectively alters said AC signal, thereby producing an altered AC signal;

rectifier means coupled to said alternating current source and said switching means for combining and rectifying said AC signal and said altered AC signal to produce a DC voltage; and an AC voltage drive coupled to said control signal generator and said rectifier means, said AC voltage drive producing a pulsed voltage waveform that embodies said optimal waveform criteria for driving the variable speed motor, wherein said pulsed voltage waveform is derived from said control signal and said DC voltage determines the voltage amplitude associated with said pulsed voltage waveform.

3. The device according to claim 2, wherein said optimal waveform criteria includes pulsewidth and pulse repetition frequency.

4. The device according to claim 3, wherein said control signal produced by said control signal generator contains said pulsewidth and said pulse repetition frequency.

5. The device according to claim 2, wherein the variable speed motor is a three phase AC motor and said pulsed voltage waveform includes three waveforms offset by 120 degrees, wherein each of said waveforms has said pulsewidth and said pulse repetition frequency.

6. The device according to claim 4, wherein said control signal is a periodic pulse train with alternating polarity voltage pulses.

7. The device according to claim 2, wherein said control signal is synchronized to said AC signal.

8. The device according to claim 2, wherein said processing means for determining optimal waveform criteria includes a microprocessor and memory, wherein said microprocessor retrieves said optimal waveform criteria from memory.

9. The device according to claim 2, wherein said processing means for determining optimal waveform criteria includes a microprocessor for deriving said optimal waveform criteria from said operational speed.

10. The device according to claim 2, wherein said switching means includes a triac, wherein said triac includes an input port coupled to said alternating current source, an output port coupled to said rectifier means and a gate coupled to said control signal generator, whereby the control signal produced by said control signal generator controls the function of said triac.

* * * * *